(12) United States Patent
Landrith, II et al.

(10) Patent No.: US 9,416,628 B2
(45) Date of Patent: Aug. 16, 2016

(54) BLOWOUT PREVENTER ACTIVATOR AND METHOD OF USING SAME

(71) Applicant: National Oilwell Varco, L.P., Houston, TX (US)

(72) Inventors: James Ray Landrith, II, Humble, TX (US); Matthew Christopher Quattrone, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 0 days.

(21) Appl. No.: 14/312,329

(22) Filed: Jun. 23, 2014

(65) Prior Publication Data

US 2014/0374118 A1    Dec. 25, 2014

Related U.S. Application Data

(60) Provisional application No. 61/838,438, filed on Jun. 24, 2013.

(51) Int. Cl.
| | |
|---|---|
| *F15B 13/042* | (2006.01) |
| *F16K 37/00* | (2006.01) |
| *F16K 31/143* | (2006.01) |
| *F15B 21/04* | (2006.01) |
| *E21B 41/00* | (2006.01) |
| *E21B 33/035* | (2006.01) |

(Continued)

(52) U.S. Cl.
CPC ......... *E21B 41/0007* (2013.01); *E21B 33/0355* (2013.01); *E21B 33/06* (2013.01); *E21B 34/16* (2013.01); *F16K 31/122* (2013.01)

(58) Field of Classification Search
CPC .... E21B 33/0355; E21B 33/06; E21B 33/064
See application file for complete search history.

(56) References Cited

U.S. PATENT DOCUMENTS

| | | | |
|---|---|---|---|
| 4,011,892 A | 3/1977 | Kowalski | |
| 4,699,355 A * | 10/1987 | Tomlin | E21B 33/0355 251/62 |

(Continued)

FOREIGN PATENT DOCUMENTS

WO    2012/037173    3/2012

OTHER PUBLICATIONS

Januarilham, Yahya, "Analysis of Component Critically in the Blowout Preventer", XP055155092, Jun. 14, 2012, [retreived on Nov. 26, 2014], [retreived from internet URL: http://brage.bibsys.no/xmlui/bitstream/handle/112501182183/Januarilham,%20Yahya.pdf?sequence=1], 151 pages.

(Continued)

*Primary Examiner* — Matthew R Buck
*Assistant Examiner* — Douglas S Wood
(74) *Attorney, Agent, or Firm* — JL Salazar Law Firm

(57) ABSTRACT

The disclosure relates to an activator for a blowout preventer of a wellsite. The blowout preventer includes rams sealingly positionable about a tubular of a wellbore at the wellsite and driven by a circuit. The activator includes a cylinder, a trigger valve operatively connectable between the cylinder and the circuit, a piston, and a timing adjuster. The trigger valve includes a trigger to selectively pilot the circuit. The piston has a piston stroke extending between a retracted position and an extended position. The timing adjuster is engagable by the piston and adjustably positionable about the cylinder to define the retracted position of the piston stroke whereby a length of the piston stroke is adjustably defined.

24 Claims, 9 Drawing Sheets

(51) Int. Cl.
  *E21B 33/06* (2006.01)
  *E21B 34/16* (2006.01)
  *F16K 31/122* (2006.01)

(56) References Cited

U.S. PATENT DOCUMENTS

| | | | |
|---|---|---|---|
| 4,836,243 A * | 6/1989 | Ferrell | F16K 3/314 |
| | | | 137/556 |
| 5,398,761 A | 3/1995 | Reynolds et al. | |
| 5,409,040 A | 4/1995 | Tomlin | |
| 5,778,918 A * | 7/1998 | McLelland | E21B 33/0355 |
| | | | 137/15.02 |
| 6,622,799 B2 | 9/2003 | Dean | |
| 6,755,261 B2 | 6/2004 | Koederitz | |
| 7,367,396 B2 | 5/2008 | Springett et al. | |
| 8,220,773 B2 | 7/2012 | Gustafson | |
| 2003/0131884 A1 | 7/2003 | Hope et al. | |
| 2004/0107991 A1 | 6/2004 | Hollister et al. | |
| 2006/0191777 A1 | 8/2006 | Glime | |
| 2007/0102042 A1 | 5/2007 | Thrash, Jr. et al. | |
| 2010/0084588 A1 | 4/2010 | Curtiss, III et al. | |
| 2010/0154896 A1 | 6/2010 | Thrash, Jr. et al. | |
| 2011/0073793 A1 | 3/2011 | Allen | |
| 2011/0120734 A1 | 5/2011 | Dietz et al. | |
| 2011/0198524 A1 | 8/2011 | Wood et al. | |
| 2011/0266003 A1 | 11/2011 | Singh et al. | |
| 2012/0111572 A1 * | 5/2012 | Cargol, Jr. | E21B 33/0355 |
| | | | 166/363 |
| 2012/0222760 A1 | 9/2012 | Marica | |
| 2013/0081823 A1 | 4/2013 | Wood | |
| 2013/0146303 A1 | 6/2013 | Gustafson | |
| 2013/0313449 A1 | 11/2013 | Weir et al. | |

OTHER PUBLICATIONS

International Search Report for PCT Patent No. PCT/US2014/043718 dated May 12, 2014, 5 pages.
International Preliminary Report on Patentability for PCT Patent Application No. PCT/US2014/034041 dated Nov. 3, 2015, 7 pages.
International Search Report and Written Opinion for PCT Patent Application No. PCT/US2014/034041 dated Jun. 23, 2015, 11 pages.
Examination Report for EP Patent Application No. 14728367.5 dated Dec. 10, 2015, 2 pages.
International Preliminary Report on Patentability and Written Opinion for PCT Patent Application No. PCT/US2014/043718 dated Dec. 29, 2015, 9 pages.

* cited by examiner

… (1) …

BLOWOUT PREVENTER ACTIVATOR AND METHOD OF USING SAME

CROSS-REFERENCE TO RELATED APPLICATIONS

This application claims priority to U.S. Provisional Application No. 61/838,438 filed on Jun. 24, 2013, the entire contents of which are hereby incorporated by reference herein.

BACKGROUND

This present disclosure relates generally to wellsite operations. More specifically, the present disclosure relates to activation of wellsite components, such as blowout preventers.

Various oilfield operations may be performed to locate and gather valuable downhole fluids. Oil rigs are positioned at wellsites, and downhole tools, such as drilling tools, are deployed into the ground to reach subsurface reservoirs. Once the downhole tools form a wellbore (or borehole) to reach a desired reservoir, casings may be cemented into place within the wellbore, and the wellbore completed to initiate production of fluids from the reservoir. Tubulars (or tubular strings) may be provided for passing subsurface fluids to the surface. Wellheads may be positioned about the wellbore at a surface end thereof to connect the tubulars to surface equipment.

In subsea operations, a riser may be provided to fluidly connect the wellhead to a surface platform for passing fluid therebetween. Various devices, such as blowout preventers, lower marine riser packages, manifolds, etc., may be located about the subsea wellhead to perform subsea operations. For example, blowout preventers may be positioned about a tubular at the wellhead to sever and/or seal the wellbore in the event of a blowout. The blowout preventers may have rams to engage the tubular and prevent the passage of fluid therethrough. Examples of blowout preventers are provided in Patent/App. Nos. WO2012/037173 and U.S. Pat. No. 7,367,396. Blowout preventers may be provided with hydraulics for operation thereof.

SUMMARY

In at least one aspect, the disclosure relates to an activator for a blowout preventer of a wellsite. The blowout preventer includes rams sealingly positionable about a tubular of a wellbore at the wellsite and driven by a circuit. The activator includes a cylinder, a trigger valve operatively connectable between the cylinder and the circuit (the trigger valve comprising a trigger to selectively pilot the circuit), a piston slidably positionable in the cylinder and having a piston stroke extending between a retracted position and an extended position, and a timing adjuster engagable by the piston. The timing adjuster is adjustably positionable about the cylinder to define the retracted position of the piston stroke whereby a length of the piston stroke is adjustably defined.

The cylinder may include a top cap, a middle cap, and an end cap. The timing adjuster includes a timing rod operatively connectable to the cylinder. The housing has an end cap to threadedly receive the timing adjuster. The cylinder has a sea chamber and a piston chamber separated by a middle cap. The piston is slidably positionable in the piston chamber with a tip of the piston extending through the middle cap and into the sea chamber. The trigger valve includes a directional control valve and the trigger comprises a plunger. The trigger valve includes a cam selector valve and the trigger comprises a follower. In the extended position, the piston may engage the trigger to permit flow through the trigger valve or the piston may not engage the trigger. The cylinder has at least one window therethrough, the piston viewable through the window(s).

In another aspect, the disclosure relates to a system for activating a blowout preventer of a wellsite. The blowout preventer includes rams sealingly positionable about a tubular of a wellbore at the wellsite. The system includes a circuit and an activator. The circuit is operatively connectable to the blowout preventer. The circuit includes a sequencing valve operatively connectable to a first of the rams and a supply valve operatively connectable to a second of the rams. The activator is operatively connectable to the circuit. The activator includes a cylinder, a trigger valve operatively connectable between the cylinder and the circuit (the trigger valve comprising a trigger to selectively pilot the circuit), a piston slidably positionable in the cylinder and having a piston stroke extending between a retracted position and an extended position, and a timing adjuster engagable by the piston. The timing adjuster is adjustably positionable about the cylinder to define the retracted position of the piston stroke whereby a length of the piston stroke is adjustably defined.

The circuit may include a hydraulic source. The circuit may include a first flowline extending from the first ram to the activator and a second flowline extending from the activator to the second ram. The sequencing valve is positionable along the first flowline. The supply valve is positionable along the second flowline. The circuit may include at least one flow control device. The flow control device includes a filter, a flow restrictor, and/or a check valve. The circuit may also include a pressure valve, a dump valve, at least one control valve, and/or a pressure controller.

Finally, in another aspect, the disclosure relates to a method of activating a blowout preventer of a wellsite. The blowout preventer includes rams sealingly positionable about a tubular of a wellbore at the wellsite. The method involves operatively connecting an activator with the blowout preventer via a circuit. The activator includes a cylinder, a trigger valve operatively connectable between the cylinder and the circuit, a piston slidably positionable in the cylinder, and a timing adjuster. The method also involves driving the piston by passing fluid from a first set of the rams to the cylinder via the circuit, selectively piloting the circuit by adjustably defining a stroke of the piston with the timing adjuster and selectively engaging the trigger valve with the piston, and upon piloting the circuit, driving a second set of the rams by passing fluid from the circuit to the second set of rams.

The method may also involve controlling flow of fluid through the circuit, dumping at least a portion of fluid in the circuit, determining a position of the piston, and/or activating a dump valve, a sequencing valve, a control valve, a pressure valve, and/or a supply valve. The selectively piloting may involve reducing the piston stroke by extending the timing adjuster towards the trigger valve, or increasing the piston stroke by retracting the timing adjuster away from the trigger valve.

BRIEF DESCRIPTION DRAWINGS

So that the above recited features and advantages can be understood in detail, a more particular description, briefly summarized above, may be had by reference to the embodiments thereof that are illustrated in the appended drawings. It is to be noted, however, that the appended drawings illustrate only typical embodiments and are, therefore, not to be considered limiting of its scope. The figures are not necessarily to scale and certain features and certain views of the figures may be shown exaggerated in scale or in schematic in the interest of clarity and conciseness.

Figure 5B:
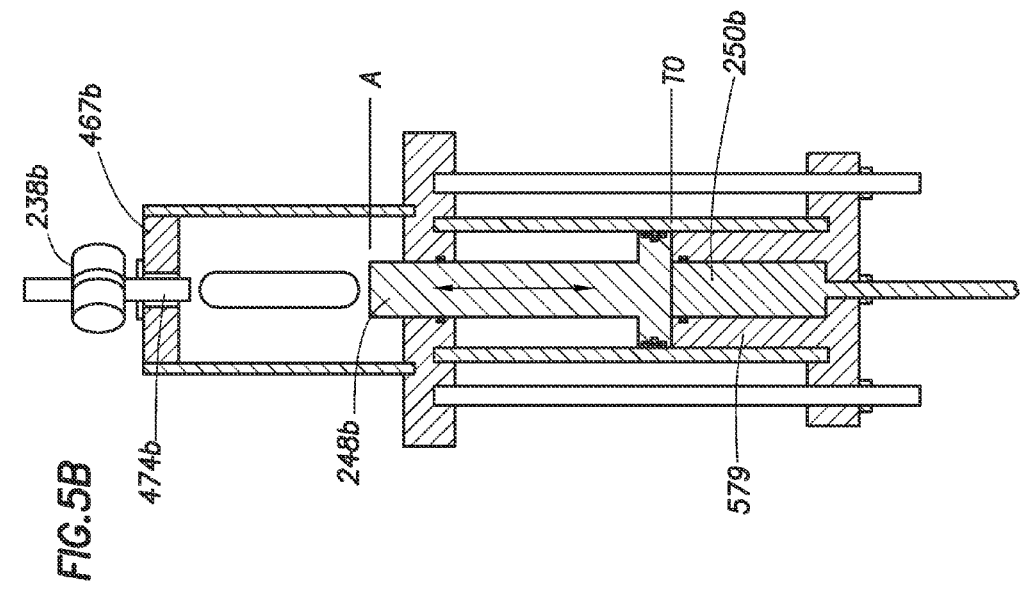
Figure 5A:
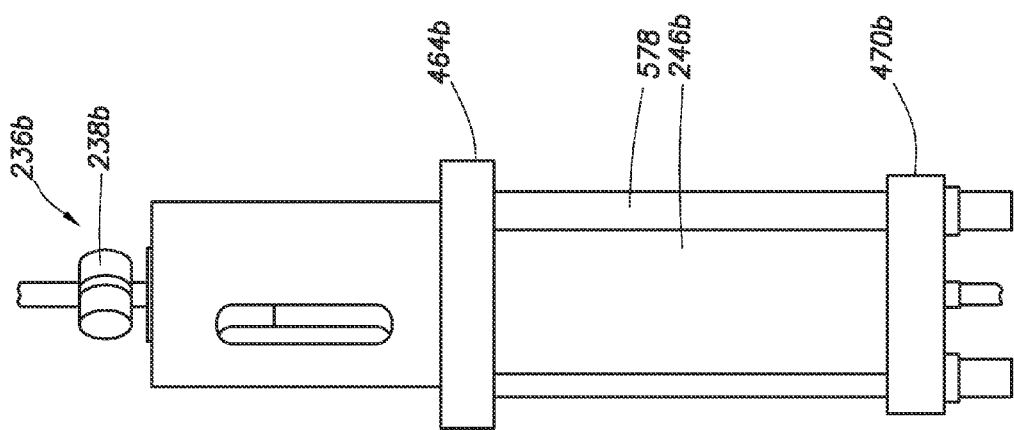
Figure 5C:
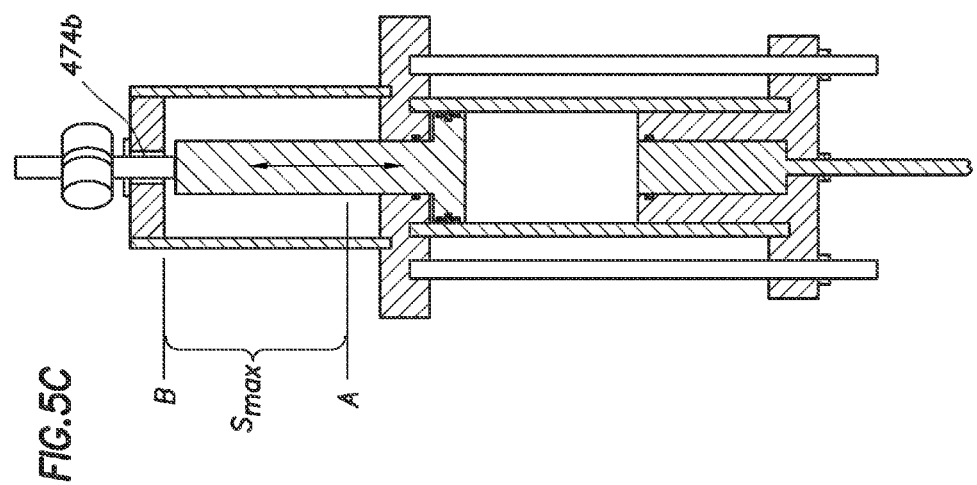

FIG. 5A is schematic front view of another activator. FIG. 5B is a vertical cross-sectional view of the activator of FIG. 5A in a retracted position. FIG. 5C shows the activator of FIG. 5B in an extended position.

Figure 6A:
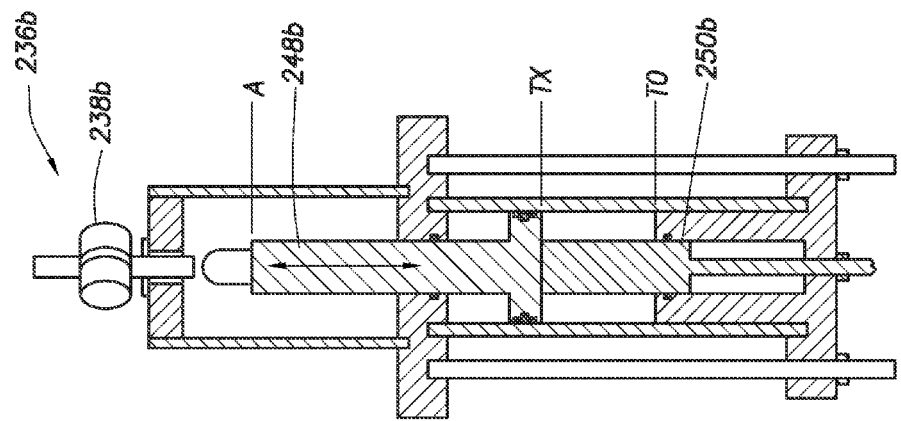
Figure 6C:
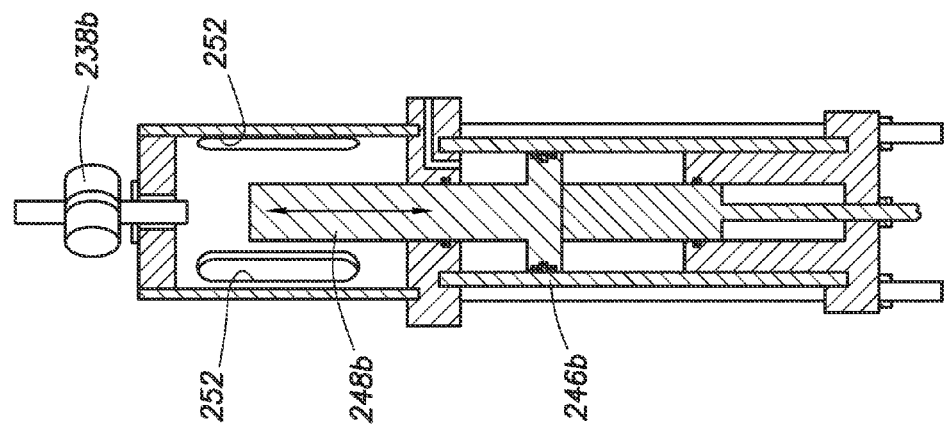
Figure 6B:
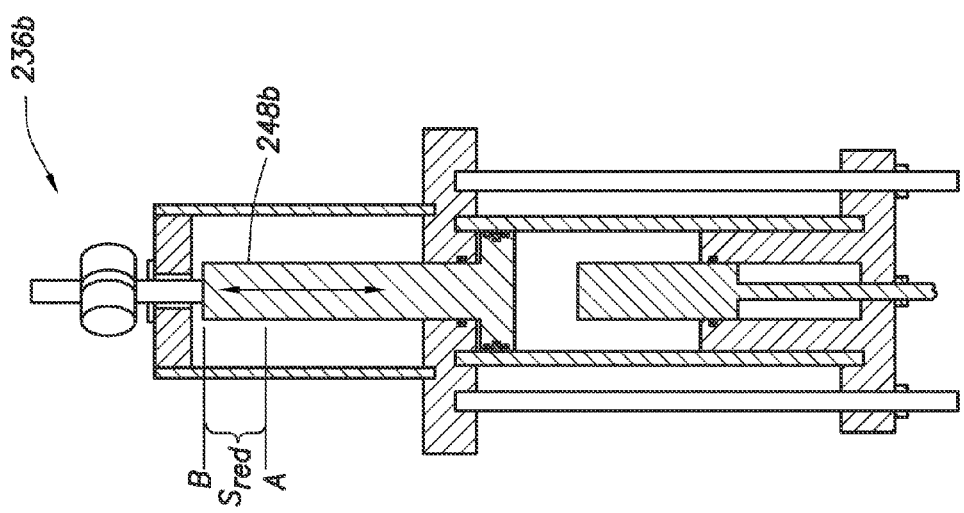

FIG. 6A is a cross-sectional view of the activator of FIG. 5A in a refracted position and at a reduced timing. FIG. 6B shows the activator of FIG. 6A in an extended position. FIG. 6C shows another cross-sectional view of the activator of FIG. 6A.

Figure 7A:
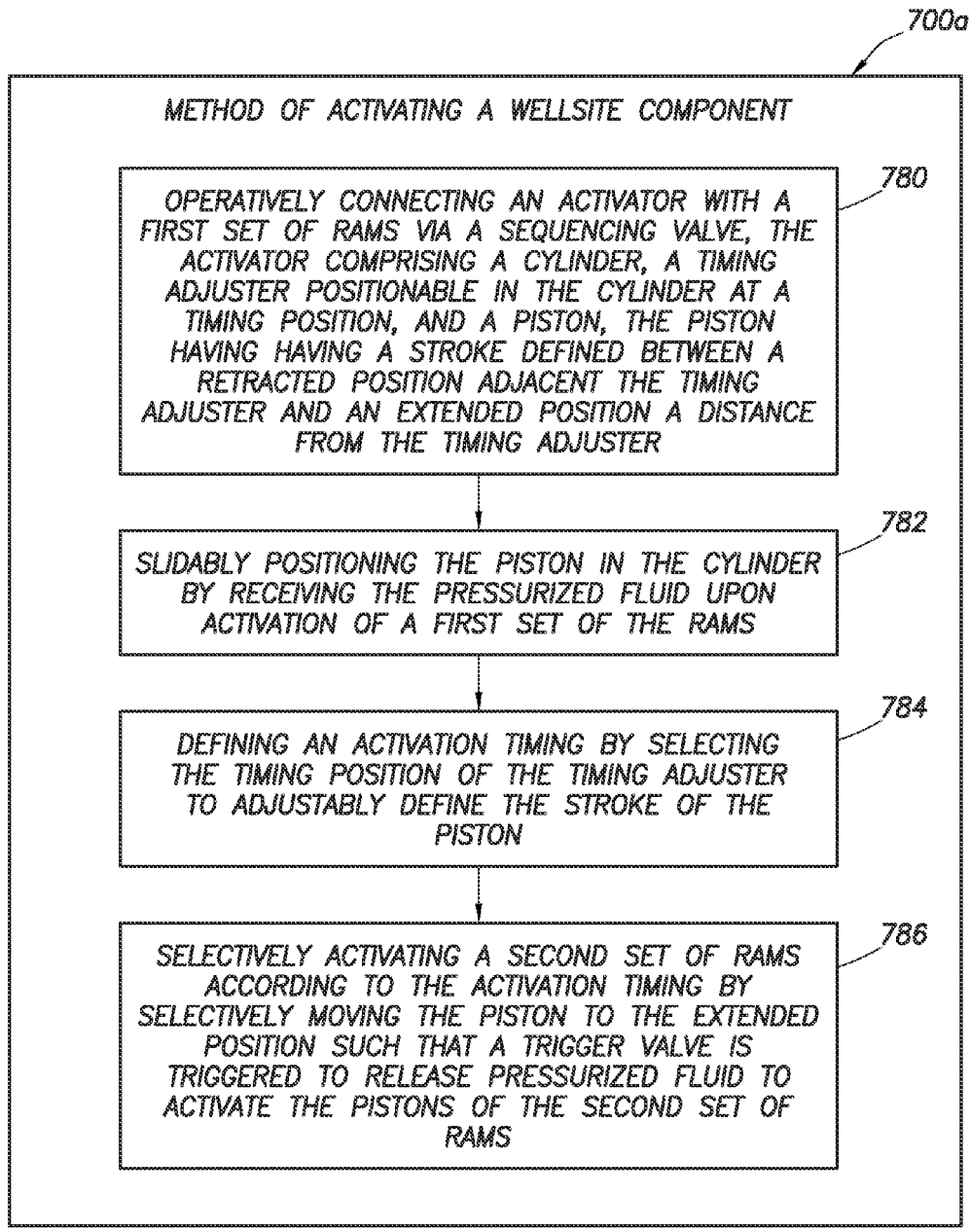
Figure 7B:
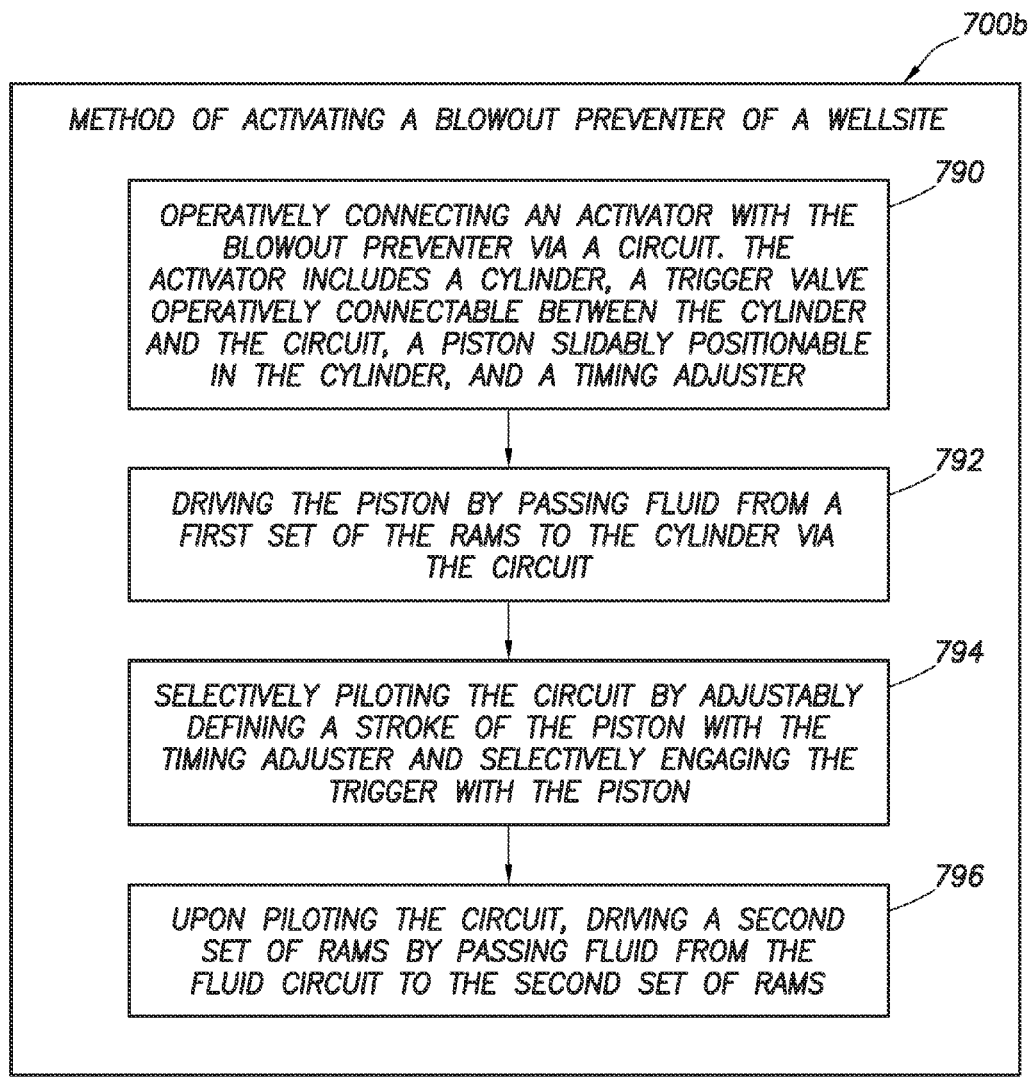

FIGS. 7A and 7B are flow charts depicting methods of activating a wellsite component and a blowout preventer, respectively.

DETAILED DESCRIPTION

In the following detailed description, numerous specific details may be set forth in order to provide a thorough understanding of embodiments of the disclosure. However, it will be clear to one skilled in the art when embodiments of the disclosure may be practiced without some or all of these specific details. In other instances, well-known features or processes may not be described in detail so as not to unnecessarily obscure the subject matter. In addition, like or identical reference numerals may be used to identify common or similar elements.

An activation system for wellsite equipment, such as a blowout preventer, is provided. The activation system includes an activator fluidly (or hydraulically) coupled by a fluid (or other) circuit to the blowout preventer for activation thereof. The blowout preventer has rams slidably positionable therein for engaging a tubular of the wellsite and/or sealing the wellbore. The activator includes a cylinder with a piston fluidly coupled to the rams by the circuit, and slidably positionable therein in response to pressure changes due to engagement of the rams. The piston is movable to an extended position for engagement with a trigger valve.

The trigger valve is activatable upon engagement by the piston. Upon activation, the trigger valve selectively pilots opens the circuit to permit hydraulic fluid to be passed to the blowout preventer to drive movement of the rams. A timing rod may be adjustably positioned in the cylinder to define a stroke of the piston and thereby define timing for activation of the trigger valve. The timing rod may be used to activate one or more rams as desired (e.g., sequentially).

Figure 1:
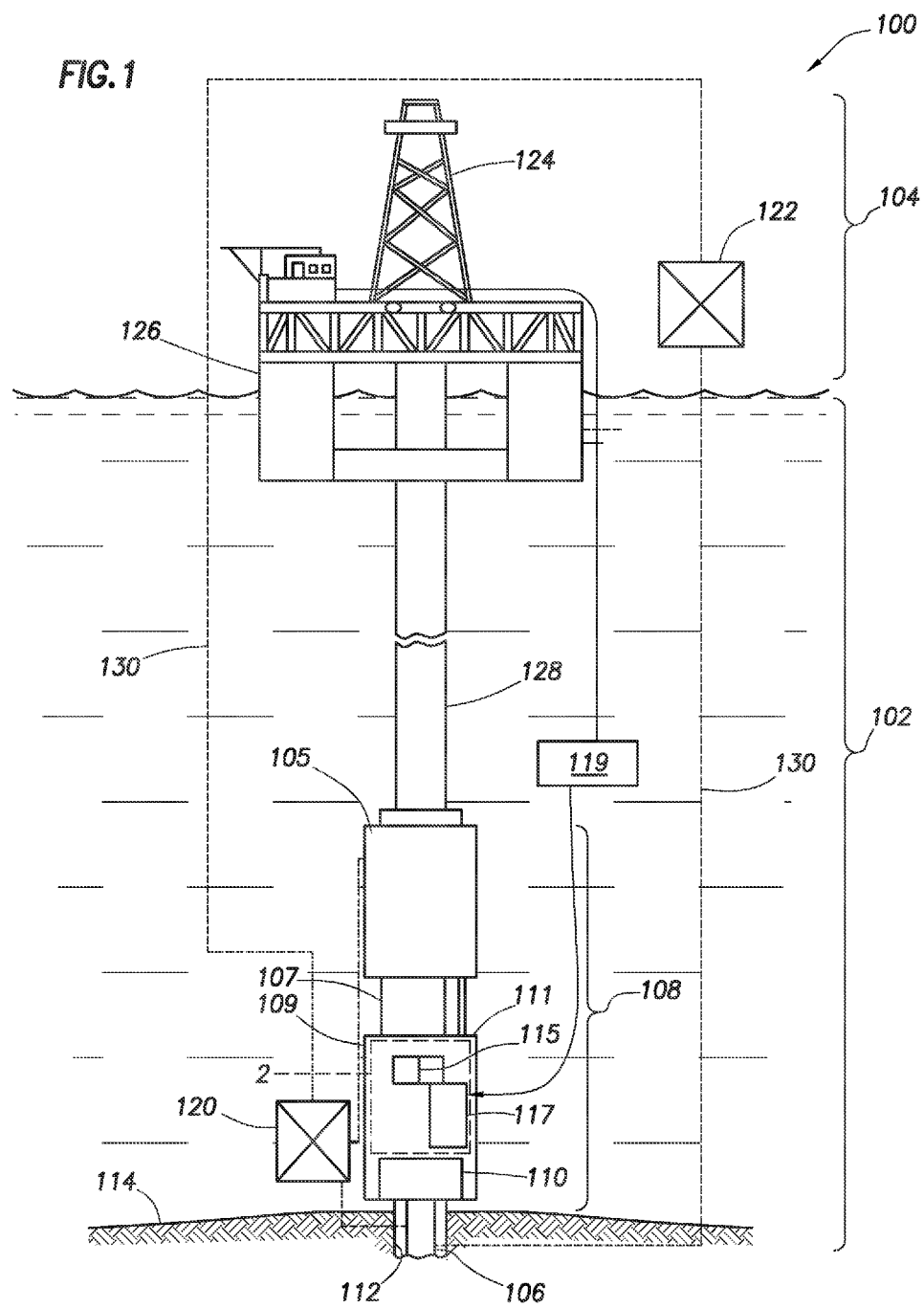
FIG. 1 is a schematic view of an offshore wellsite having a lower stack including a blowout preventer with an activation system.

FIG. 1 depicts an offshore wellsite 100 in which the subject matter of the present disclosure may be utilized. The wellsite 100 has a subsea system 102 and a surface system 104. The wellsite 100 is described as being a subsea operation, but may be for any wellsite environment (e.g., land or water based). The subsea system 102 includes a wellhead 110 extending from a wellbore 112 in a sea floor 114, and a wellsite connection assembly 108 thereabove. A tubular 106 extends from the wellhead 110 into the wellbore 112.

The wellsite assembly 108 includes a Lower Marine Riser Package (LMRP) 105, a mandrel 107, and a lower stack 109.

As shown in FIG. 1, the lower stack 109 is provided with a blowout preventer 111 with rams 115 slidably positionable therein, and an activation system 117 for driving rams 115. A remote operated vehicle (ROV) 119 may be provided to monitor and/or activate the activation system 117.

A subsea controller 120 is provided for operating, monitoring and/or controlling the LMRP 105, the blowout preventer 111 and the rams 115, the lower stack 109, the activation system 117, the ROV 119, and/or other portions of the wellsite 100.

The surface system 104 includes a rig 124, a platform 126 (or vessel), a riser (or tubular) 128 and a surface controller 122. The riser 128 extends from the platform 126 to the subsea assembly 108 for passing fluid therethrough. Part (or all of) the riser 128 and/or tubular 106 may pass through the subsea assembly 108 and provide fluid communication therebetween.

The surface controller 122 is provided for operating, monitoring and/or controlling the rig 124, platform 126 and/or other portions of the wellsite 100. As shown, the surface controller 122 is at a surface location and the subsea controller 120 is at a subsea location (e.g., at the platform 126, a vessel (not shown), or offsite). However, it will be appreciated that the one or more controllers 120/122 may be located at various locations to control the surface 104 and/or the subsea systems 102. Communication links 130 may be provided for communication with various parts of the wellsite 100, such as the controllers 120/122.

While FIG. 1 shows a specific configuration of a variety of wellsite components (or devices), one or more blowout preventers, LMRPs, pumps, ROVs, stacks, or other components and/or combinations thereof, may be provided with one or more blowout preventers 111, rams 115, activation systems 117 and/or other components as depicted.

Figure 2:
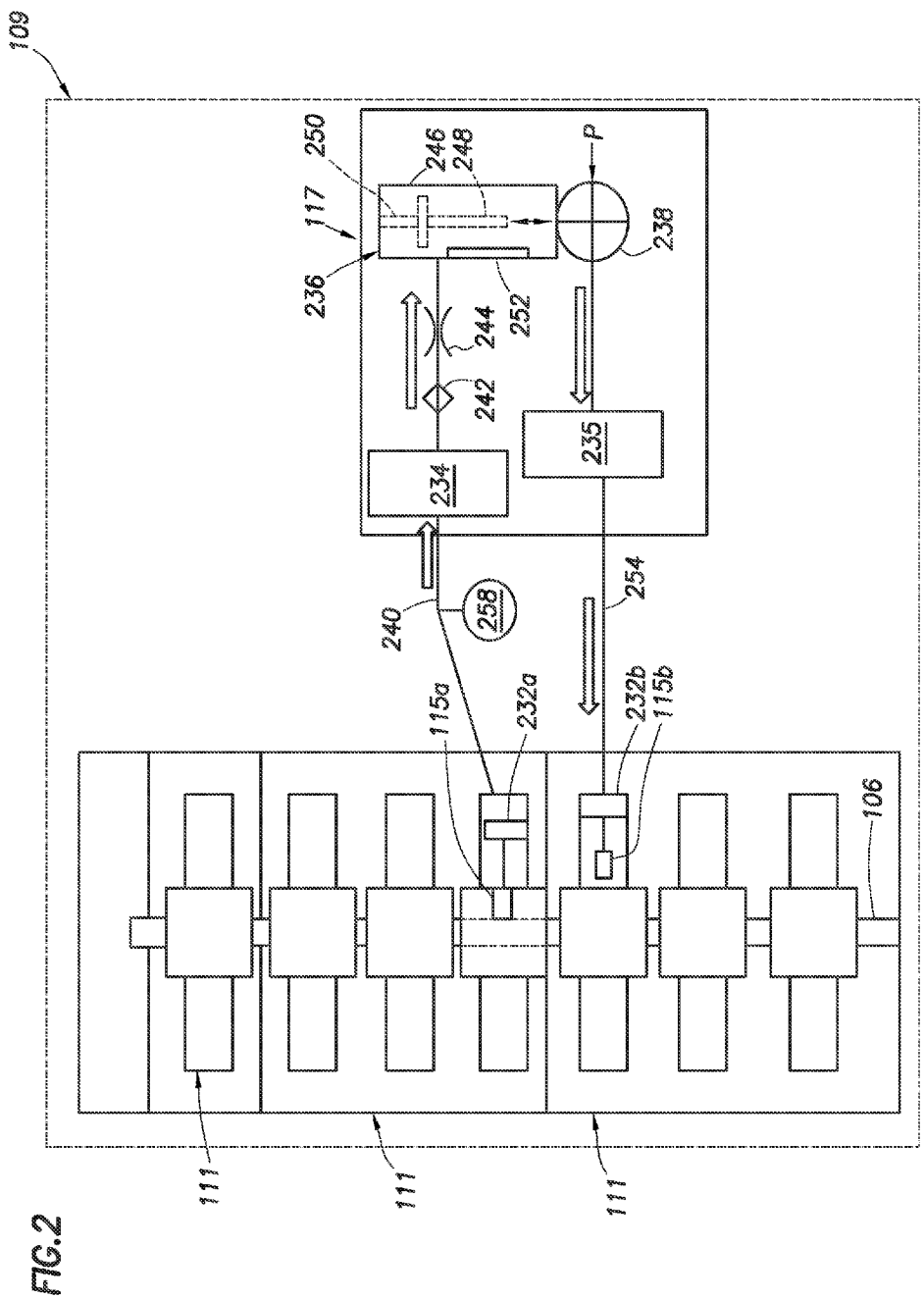
FIG. 2 is another schematic view of the lower stack of FIG. 1 depicting the blowout preventer and the activation system.

FIG. 2 depicts a portion of the lower stack 109 in greater detail. The lower stack has the blowout preventer(s) 111 and the activation system 117 therein. As shown in this view, the lower stack may include one or more blowout preventers 111 with one or more sets of rams 115a,b. The activation system 117 is depicted as being connectable to two sets of rams 115a,b. Each ram 115a,b is connected to a ram piston 232a,b. The activation system 117 may be connected to one or more sets of rams 115a,b and ram pistons 232a,b for selective and/or sequential activation thereof. When activated in sequence, the rams 115a,b may be activated by the activation system 117 in stages.

As depicted in this view, the activation system 117 may be operatively connectable to a first set of rams 115a and ram pistons 232a to increase pressure therebetween. The activation system 117 may also be operatively connectable to a second set of rams 115b and ram pistons 232b to send pressurized fluid thereto. The rams 115a,b may be selectively moved between an engaged position about the tubular 106 and a distance therefrom by selectively applying pressurized fluid to the ram pistons 232a,b. Pressurized fluid may be selectively passed between one or more sets of the ram pistons 232a,b and the activation system 117. The pressurized fluid may be selectively passed between the rams 115a,b to selectively activate the rams 115a,b to engage the tubular 106 to seal thereabout.

The activation system 117 includes a sequencing valve 234, an activator 236 with a trigger valve 238, and a supply valve 235. The sequencing valve 234 may be used to selectively pass pressurized fluid from a hydraulic source 258 supplying the ram piston 232a to the activator 236. The sequencing valve 234 may be configured to pass fluid from the hydraulic source 258 supplying the ram pistons 232 along an intake line 240 when a predetermined pressure is achieved. The sequencing valve 234 as used herein is an optional valve that may be used, for example, for determining timing based on pressure. The sequencing valve 234 may be, for example, a conventional sequencing valve or any flow control valve.

Hydraulic source 258 is positioned along intake 240 to provide fluid to sequencing valve 234 and to piston 232a and ram 115a. Once the ram 115a contacts tubular 106, the pressure in line 240 increases and sequencing valve 234 is triggered, allowing high pressure flow into the activation system 117. Sequencing valve 234 is then moved to an open position and passes flow from intake line 240 to activator 236.

In a given example, when the rams 115a engage the tubular 106, pressurized fluid may move to the sequence valve 234 along the intake line. As the rams 115a come into contact with the tubular 106 and begins shearing, the pressure in the intake line 240 spikes. When a predetermined pressure is reached, the sequence valve 234 opens and allows the pressurized fluid to flow from intake line 240 and into the activator 236.

The activation system 117 may optionally include a filter 242 to filter the pressurized fluid and/or an orifice 244 to restrict flow of the pressurized fluid. The filter 242 may be used to clear the fluid of particles as it passes therethrough. The orifice 244 may be used to decrease the flow rate into the activator 236. While a filter 242 and an orifice 244 are depicted, a variety of flow control devices, such as a check valve, sequence valve, quick dump valve, may be provided in various portions of the flow circuit to provide selective control of fluid flow therethrough.

The activator 236 includes a cylinder 246, an activator piston 248, a timing adjuster 250, and an indicator window 252. The activator piston 248 is slidably positionable in the cylinder 246. The timing adjuster (or rod) 250 may be, for example, a rod positioned in the cylinder 246 to restrict axial movement of the activator piston 248. The fluid comes into the cylinder 246 and strokes the activator piston 248 as the fluid level in the cylinder 246 increases. The position of the activator piston 248 may be preset through the use of the timing adjuster 250. The position of the timing adjuster may be used to determine the length of stroke of activator piston 248, which regulates the time to the next stage. Window 252 may be provided to give a visual indication of the position of the piston 248 within the cylinder 246.

The activator piston 248 is slidably positionable in the cylinder 246 between a retracted position adjacent the timing adjuster 250 and an extended position adjacent the trigger valve 238. In the extended position, the activator piston 248 may engage the trigger valve 238 for triggering thereof. Upon triggering, the valve 238 is movable to an open position to release pressurized fluid P to pilot supply valve 235. Supply valve 235 then activates another ram 115b and ram piston 232b. The trigger valve 238 may be used to trigger each of the next rams and ram pistons in sequence in subsequent stage.

The trigger valve 238 may be coupled to additional outtake lines to allow for the pressurized fluid to selectively flow on to the next supply valve 235 in order to activate another ram 115 via outtake line 254. One or more rams and pistons may be fluidly coupled to the trigger valve 238 for selective action thereof in a desired sequence. The timing adjuster 250 may be positioned to provide the desired timing for activation.

Figure 3:
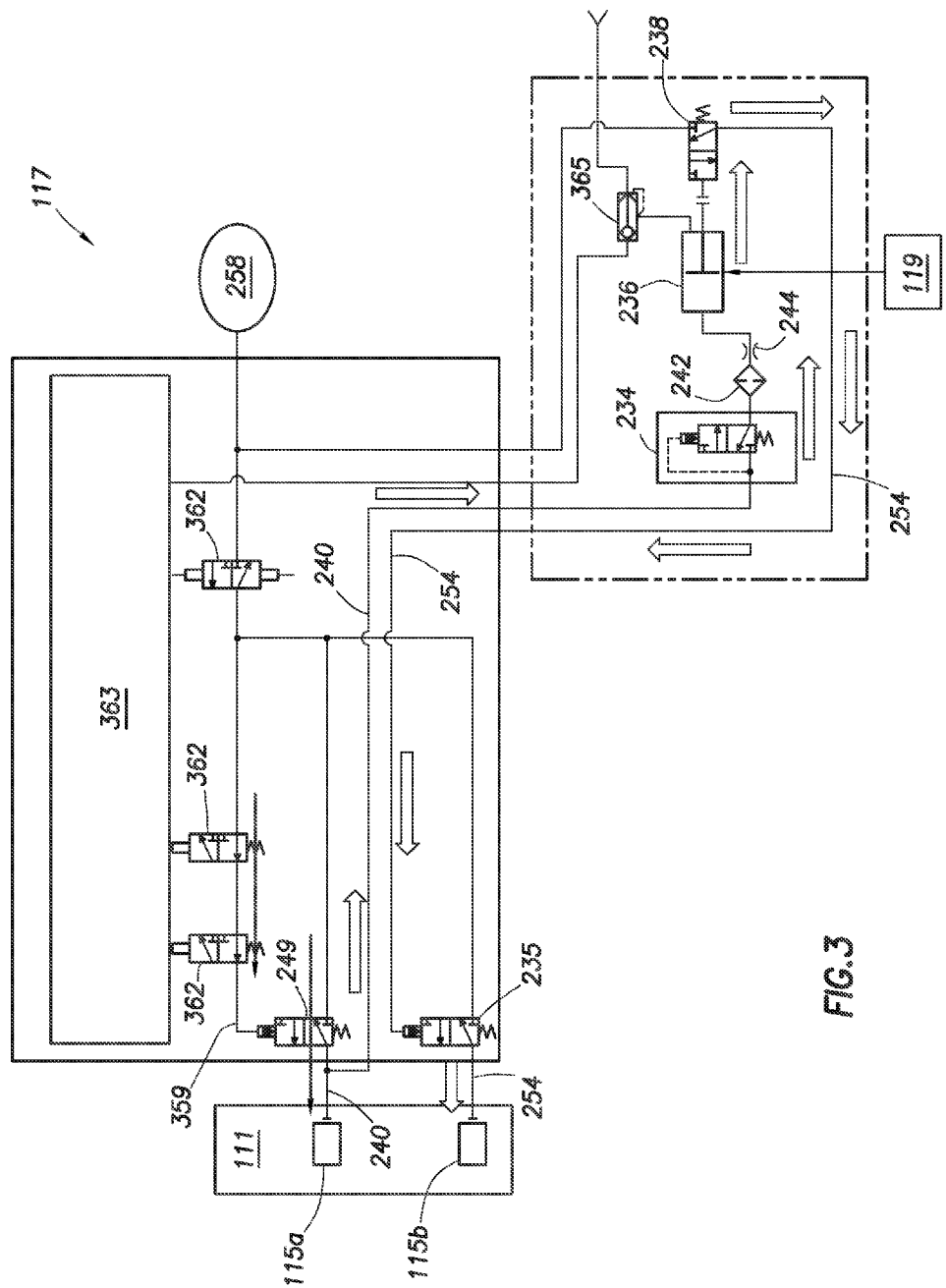
FIG. 3 is a detailed view of the activation system of FIG. 2.

FIG. 3 is another optional configuration of the activation system 117. The sequencing valve 234 is fluidly coupled by flowline 240 to ram 115a and the trigger valve 238 is fluidly coupled to supply valve 235 for activation of ram 115b as previously described in FIG. 2 and as shown by the heavy arrows. ROV 119 is depicted as being operatively connectable to or positionable about the activator 236 for viewing operation thereof. For example, the ROV 19 may be used to view a portion of the piston 248 in the cylinder 246 via window 252 (FIG. 2).

As also shown in FIG. 3, the activation system 117 may be provided with additional devices to provide various functions. For example, the activation system 117 may be provided with other devices, such as dump valve 365 to selectively vent fluid from activator 236. In another example, a pressure controller 363 may be coupled by a control flowline 359 to the ram 115a. A pressure valve 249 may be provided to selectively fluidly couple intake flowline 240 with control flowline 359. A pressure controller 363 may be selectively fluidly coupled to pressure valve 249 by control valves 362 as indicated by the thin arrows.

Upon a loss of power and/or hydraulics, pressure controller 363 may be placed in fluid communication with 115a via valves 362 and 249 to activate ram 115a. The pressure controller 363 may have pressure devices, such as accumulators and/or bleed off valves, to provide increased or decreased pressure as needed. Thus, the activation system 117 may be configured to manipulate fluid flow to activate the rams in the desired sequence.

Figure 4C:
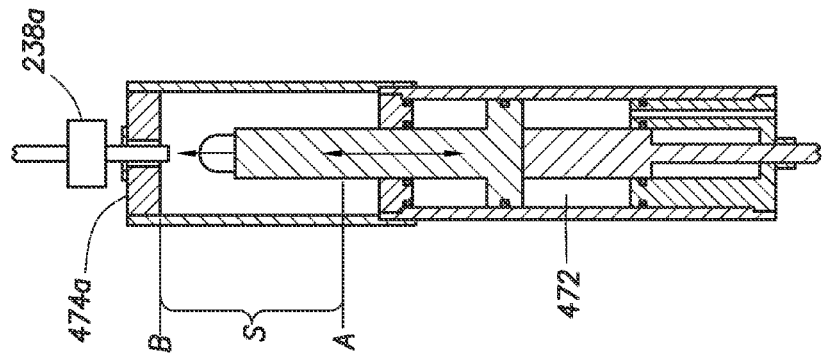
FIG. 4C shows the activator of FIG. 4B in a reduced timing position.
Figure 4B:
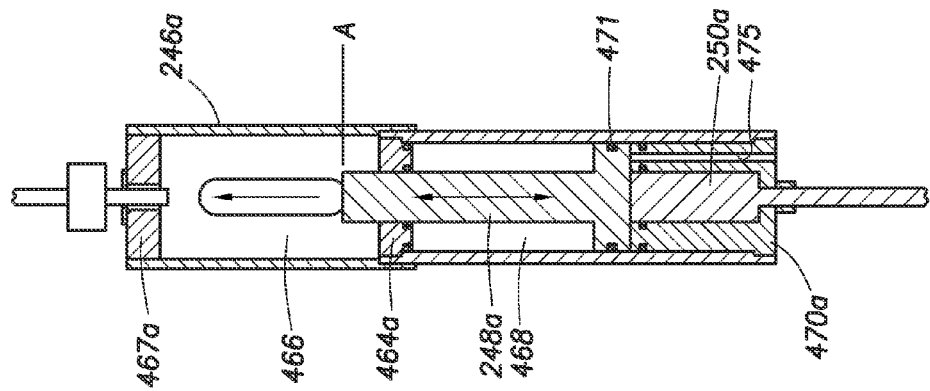
FIGS. 4A and 4B are schematic front and vertical cross-sectional views of an activator in a retracted position.
Figure 4A:
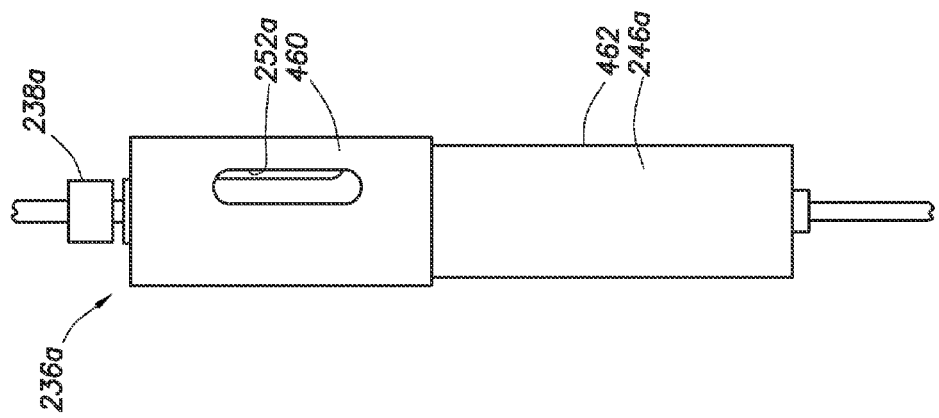

FIGS. 4A-4C depict an example activator 236a that may be used as the activator 236 to selectively trigger the trigger valve 238a. As shown in FIG. 4A, the activator 236a includes a cylinder 246a with a sea portion 460 and a seal portion 462. The sea portion 460 has a window 252a therethrough.

As shown in FIG. 4B, the cylinder includes a top cap 467a, a middle cap 464a and an end cap 470a. The activator 236a may also be provided with other features, such as seals 471. The middle cap 464a separates a sea chamber 466 in the sea portion 460 from a piston chamber 468 in the seal portion 462. Piston 248a is slidably positionable in the cylinder 246a and through the middle cap 464a. The piston 248a defines the piston chamber 468 and a capside chamber 472 within the seal portion 462.

FIG. 4B shows the piston 248a in the retracted position. FIG. 4C shows the piston 248a in the retracted position in a reduced timing orientation. A timing adjuster (or rod) 250a is positioned through the end cap 470a at a seal end of the cylinder 246a. The capside chamber 472 is defined between the piston 248a and the end cap 470a. The piston 248a has a stroke that is defined between a retracted position adjacent the timing adjuster 250a and an extended position about the trigger valve 238a. The timing adjuster 250a is selectively positionable in the end cap 470a to define a stroke S of the piston 248a between a retracted position A adjacent the timing adjuster 250a and the extended position B about the trigger valve 238a. In some cases, in the extended position B, the piston 248a is in contact with the trigger valve 238a and in some cases the piston 248a is a distance therefrom.

The timing adjuster 250a may be adjusted, for example, by threadedly advancing and retracting the timing adjuster 250a into the end cap 470a. The adjustment may optionally be made from an exterior of the cylinder 246a. The position of the timing adjuster 250a may optionally be selected to adjust the length of time for the piston 248a to advance to the extended position and trigger the trigger valve 238a. The piston 248a may be examined, for example by ROV 119 of FIG. 1, and the piston 248a selectively adjusted to a desired position as viewable by the ROV 119.

Once the piston 248a has been adjusted, the pressurized fluid supplying the ram 115 and ram piston 232 may enter through a port 475 at the bottom of the end cap 470a. The fluid pushes the piston 248a up until the piston 248a reaches the trigger valve 238a and triggers the trigger valve 238a. The piston 248a is engagable with a trigger (or plunger) 474a of the trigger valve 238a. The trigger 474a may be used to switch the trigger valve 238a between a closed position and an open position. In the open position, the trigger valve 238a permits the passage of hydraulic fluid to the supply valve 235 to function the rams (see, e.g., FIGS. 2-3).

The trigger valves provided herein, such as trigger valve 238 of FIG. 2, 238a of FIGS. 4A-4C, and 238b of FIGS. 5A-6C, may be any valve capable of selectively providing flow therethrough upon engagement with the piston. The flow through the trigger valves may be used, for example, to pilot the supply valve 235 (FIG. 2). The trigger valve may be, for example, a directional control valve, such as a plunger valve 238a with plunger 474a as shown in FIGS. 4A-4C, a cam selector trigger valve 238b with a follower 474b contactable by the piston 248b as shown in FIGS. 5A-6C, or other trigger valve capable of piloting supply valve 235 upon engagement by the piston.

FIGS. 5A-5C depict another version of the activator 236b having a piston 248b in a cylinder 246b. FIG. 5A shows a perspective view of the activator 236b and trigger valve 238b. FIG. 5B shows the piston 248b stroked to the retracted position adjacent the timing adjuster (or rod) 250b. FIG. 5C shows the piston 248b stroked to the extended position in engagement with the trigger valve 238b.

The activator 236b is the same as activator 236a, except that the cylinder 246b has a top cap 467b, a middle cap 464b and an end cap 470b about an outer surface thereof. The middle cap 464b is coupled to the end cap 470b by tie rods 578. The middle cap 464b has a hole therethrough and acts as an extended version of the middle cap 464a of FIGS. 4B-4C for receiving the piston 248b therethrough. The end cap 470b has an end positionable about an end of the cylinder 246b and a timing support 579 positionable in the cylinder 246b to slidingly receive the timing adjuster 250b.

To achieve the maximum amount of time, the timing adjuster 250b may be placed in the fully refracted position of FIG. 5B, referred to as T0. This position of the timing adjuster 250b allows the piston 248b to start its stroke from the furthest point from trigger valve 238b. The stroke extends from the starting point A with the trigger at T0, and terminates at the trigger (or follower) 474b. With the timing adjuster 250b in the retracted position, a maximum stroke Smax is achieved. In this case maximum length from A to B corresponds to maximum stroke time. The time may be shortened by extending the timing adjuster 250b.

FIGS. 6A-6B depict the activator 236b with a reduced stroke Sred. In this case the timing adjuster 250b is moved from stroke position T0 to extended stroke position TX. With the timing adjuster 250b in the TX position, the stroke of the piston 248b is reduced to Sred. This translates to a lower time for travel of the piston 248b to contact and activate the trigger valve 238b.

As demonstrated by FIG. 6C, the activator may be provided with various other optional features. For example, the cylinder 246b is provided with dual windows 252 for viewing the position of the piston 248b.

FIG. 7A shows a flow chart of a method 700a of activating a wellsite component, such as a blowout preventer of a wellsite. The method involves 780—operatively connecting an activator with a first set of rams via a sequencing valve. The activator may be any activator as described herein. The activator includes a cylinder, a timing adjuster positionable in the cylinder at a timing position, and a piston. The piston has a stroke defined between a retracted position adjacent the timing adjuster and an extended position a distance from the timing adjuster.

The method also involves 782—slidably positioning the piston in the cylinder by receiving the pressurized fluid upon activation of a first set of the rams, 784—defining an activation timing by selecting the timing position of the timing adjuster to adjustably define the stroke of the piston, and 786—selectively activating a second set of rams according to the activation timing by selectively moving the piston to the extended position such that a trigger valve is triggered to release pressurized fluid to release pressurized fluid to activate the pistons of the second set of rams.

FIG. 7B depicts a method 700b of activating a blowout preventer of a wellsite. The method involves 790—operatively connecting an activator with the blowout preventer via a circuit. The activator includes a cylinder, a trigger valve operatively connectable between the cylinder and the circuit, a piston slidably positionable in the cylinder, and a timing adjuster. The method also involves 792—driving the piston by passing fluid from a first set of the rams to the cylinder via the circuit, 794—selectively piloting the circuit by adjustably defining a stroke of the piston with the timing adjuster and selectively engaging the trigger with the piston; and 796—upon piloting the circuit, driving a second set of the rams by passing fluid from the circuit to the second set of rams.

The method may also involve controlling flow of fluid through the circuit, dumping at least a portion of fluid in the circuit, determining a position of the piston, and activating at least one of a dump valve, a sequencing valve, a control valve, a pressure valve, and a supply valve.

While the subject matter has been described with respect to a limited number of embodiments, those skilled in the art, having benefit of this disclosure, will appreciate that other embodiments can be devised which do not depart from the scope of the subject matter as disclosed herein. Accordingly, the scope of the invention should be limited only by the attached claims.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and/or other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the invention may also be configured to perform the described functions (via appropriate hardware/software) solely on site and/or remotely controlled via an extended communication (e.g., wireless, internet, satellite, etc.) network.

The above description is illustrative of the preferred embodiment and many modifications may be made by those skilled in the art without departing from the invention whose scope is to be determined from the literal and equivalent scope of the claims that follow.

While the embodiments are described with reference to various implementations and exploitations, it will be understood that these embodiments are illustrative and that the scope of the inventive subject matter is not limited to them. Many variations, modifications, additions and improvements are possible. For example, one or more activation systems, activators, flowlines, valves and other flow devices may be provided. In another example, while activator is depicted in a specific orientation with the trigger adjacent the pilot valve, the activator may be in any orientation capable of selectively triggering the pilot valve and/or operating a circuit to activate the blowout preventer.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An activator for a blowout preventer of a wellsite, the blowout preventer comprising rams sealingly positionable about a tubular of a wellbore at the wellsite and driven by a circuit, the activator comprising:
   a cylinder;
   a trigger valve operatively connectable between the cylinder and the circuit, the trigger valve comprising a trigger extending into the cylinder;
   a piston slidably positionable in the cylinder, the piston having a piston stroke extending between a retracted position with an end of the piston in non-engagement with the trigger to close the circuit and an extended position with the end of the piston in engagement with the trigger to pilot the circuit; and
   a timing adjuster engagable by the piston, the timing adjuster adjustably positionable about the cylinder to define the retracted position of the piston stroke whereby a length of the piston stroke is adjustably defined.

2. The activator of claim 1, wherein the cylinder comprises a top cap, a middle cap, and an end cap.

3. The activator of claim 1, wherein the timing adjuster comprises a timing rod operatively connectable to the cylinder.

4. The activator of claim 1, wherein the housing has an end cap to threadedly receive the timing adjuster.

5. The activator of claim 1, wherein the cylinder has a sea chamber and a piston chamber separated by a middle cap.

6. The activator of claim 5, wherein the piston is slidably positionable in the piston chamber with a tip of the piston extending through the middle cap and into the sea chamber.

7. The activator of claim 1, wherein the trigger valve comprises a directional control valve and the trigger comprises a plunger.

8. The activator of claim 1, wherein the trigger valve comprises a cam selector valve and the trigger comprises a follower.

9. The activator of claim 1, wherein the cylinder has at least one window therethrough, the piston viewable through the at least one window.

10. A system for activating a blowout preventer of a wellsite, the blowout preventer comprising rams sealingly positionable about a tubular of a wellbore at the wellsite, the system comprising:
    a circuit operatively connectable to the blowout preventer, the circuit comprising:
        a sequencing valve operatively connectable to a first of the rams; and
        a supply valve operatively connectable to a second of the rams; and
    an activator operatively connectable to the circuit, the activator comprising:
        a cylinder;
        a trigger valve operatively connectable between the cylinder and the circuit, the trigger valve comprising a trigger extending into the cylinder;
        a piston slidably positionable in the cylinder, the piston having a piston stroke extending between a retracted position with an end of the piston in non-engagement with the trigger to close the circuit and an extended position with the end of the piston in engagement with the trigger to pilot the circuit; and
        a timing adjuster engagable by the piston, the timing adjuster adjustably positionable about the cylinder to define the retracted position of the piston stroke whereby a length of the piston stroke is adjustably defined.

11. The system of claim 10, wherein the circuit comprises a hydraulic source.

12. The system of claim 10, wherein the circuit comprises a first flowline extending from the first ram to the activator and a second flowline extending from the activator to the second ram, the sequencing valve positionable along the first flowline, the supply valve positionable along the second flowline.

13. The system of claim 10, wherein the circuit further comprises at least one flow control device, the at least one flow control device comprising at least one of a filter, a flow restrictor, a check valve, and combinations thereof.

14. The system of claim 10, wherein the circuit further comprises a pressure valve.

15. The system of claim 10, wherein the circuit further comprises a dump valve.

16. The system of claim 10, wherein the circuit further comprises at least one control valve.

17. The system of claim 10, wherein the circuit further comprises a pressure controller.

18. A method of activating a blowout preventer of a wellsite, the blowout preventer comprising rams sealingly positionable about a tubular of a wellbore at the wellsite, the method comprising:
    operatively connecting an activator with the blowout preventer via a circuit, the activator comprising a cylinder, a trigger valve operatively connectable between the cylinder and the circuit, a piston slidably positionable in the cylinder, and a timing adjuster;
    driving the piston by passing fluid from a first set of the rams to the cylinder via the circuit;
    selectively piloting the circuit by adjustably defining a stroke of the piston with the timing adjuster to selectively engage the trigger valve with an end of the piston when in an extended position; and
    upon piloting the circuit, driving a second set of the rams by passing the fluid from the circuit to the second set of the rams.

19. The method of claim 18, further comprising controlling flow of the fluid through the circuit.

20. The method of claim 18, further comprising dumping at least a portion of the fluid in the circuit.

21. The method of claim 18, further comprising determining a position of the piston.

22. The method of claim 18, further comprising activating at least one of a dump valve, a sequencing valve, a control valve, a pressure valve, and a supply valve.

23. The method of claim 18, wherein the selectively piloting comprises reducing the piston stroke by extending the timing adjuster towards the trigger valve.

24. The method of claim 18, wherein the selectively piloting comprises increasing the piston stroke by retracting the timing adjuster away from the trigger valve.

\* \* \* \* \*